United States Patent
Wang et al.

(10) Patent No.: US 10,241,708 B2
(45) Date of Patent: Mar. 26, 2019

(54) STORAGE OF A DATA CHUNK WITH A COLLIDING FINGERPRINT

(71) Applicant: HEWLETT PACKARD ENTERPRISE DEVELOPMENT LP, Houston, TX (US)

(72) Inventors: Jin Wang, Fremont, CA (US); Siamak Nazari, Fremont, CA (US); Roopesh Kumar Tamma, Fremont, CA (US); Srinivasa D Murthy, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/514,075

(22) PCT Filed: Sep. 25, 2014

(86) PCT No.: PCT/US2014/057507
§ 371 (c)(1),
(2) Date: Mar. 24, 2017

(87) PCT Pub. No.: WO2016/048331
PCT Pub. Date: Mar. 31, 2016

(65) Prior Publication Data
US 2017/0300266 A1    Oct. 19, 2017

(51) Int. Cl.
*G06F 12/00* (2006.01)
*G06F 3/06* (2006.01)
(Continued)

(52) U.S. Cl.
CPC .......... *G06F 3/0641* (2013.01); *G06F 3/0608* (2013.01); *G06F 3/0644* (2013.01);
(Continued)

(58) Field of Classification Search
None
See application file for complete search history.

(56) References Cited

U.S. PATENT DOCUMENTS

| 5,974,481 A | 10/1999 | Broder |
|---|---|---|
| 6,081,805 A | 6/2000 | Guha |

(Continued)

FOREIGN PATENT DOCUMENTS

| CN | 102629258 A | 8/2012 |
|---|---|---|
| WO | WO-0057275 A1 | 9/2000 |

(Continued)

OTHER PUBLICATIONS

Alvarez C., "Back to Basics: Deduplication," (Web Page), Net App, Tech OnTap Newsletter, Mar. 3, 2011, 7 pages, available at http://community.netapp.com/t5/Tech-OnTap-Articles/Back-to-Basics-Deduplication/ta-p/84888.

(Continued)

*Primary Examiner* — John A Lane
(74) *Attorney, Agent, or Firm* — Hewlett Packard Enterprise Patent Department

(57) ABSTRACT

Example implementations relate to data chunk storage. For example, an implementation includes an apparatus that includes a processor. The processor is to receive a first data chunk from a source device and to generate a first fingerprint of the first data chunk. In response to a determination that the first fingerprint matches a second fingerprint of a second data chunk, the processor is to select a storage pool from a plurality of storage pools at a storage device to store the first data chunk based on the first data chunk and based on the second data chunk. The plurality of storage pools includes a first storage pool associated with first particular data chunks (Continued)

with non-colliding fingerprints and a second storage pool associated with second particular data chunks with colliding fingerprints.

16 Claims, 4 Drawing Sheets

(51) Int. Cl.
    *G06F 16/23* (2019.01)
    *G06F 11/08* (2006.01)
    *G06F 11/14* (2006.01)
    *G06F 16/174* (2019.01)
(52) U.S. Cl.
    CPC ............ *G06F 3/0673* (2013.01); *G06F 11/08* (2013.01); *G06F 11/14* (2013.01); *G06F 11/1453* (2013.01); *G06F 16/1748* (2019.01); *G06F 16/2365* (2019.01); *G06F 16/2379* (2019.01)

(56) References Cited

U.S. PATENT DOCUMENTS

| | | | |
|---|---|---|---|
| 6,226,710 | B1 | 5/2001 | Melchior |
| 7,366,836 | B1 | 4/2008 | Todd et al. |
| 7,412,580 | B1 | 8/2008 | Garthwaite |
| 7,640,406 | B1 | 12/2009 | Hagerstrom et al. |
| 7,925,850 | B1 | 4/2011 | Waldspurger et al. |
| 7,979,670 | B2 | 7/2011 | Saliba et al. |
| 8,055,599 | B1 | 11/2011 | Werth |
| 8,086,799 | B2 | 12/2011 | Mondal et al. |
| 8,115,660 | B2 | 2/2012 | Kaufman et al. |
| 8,199,911 | B1 | 6/2012 | Tsaur et al. |
| 8,205,065 | B2 | 6/2012 | Matze |
| 8,219,821 | B2 | 7/2012 | Zimmels et al. |
| 8,224,874 | B2 | 7/2012 | Guo et al. |
| 8,266,430 | B1 | 9/2012 | Lumb |
| 8,327,061 | B2 | 12/2012 | Boldy et al. |
| 8,356,020 | B2 | 1/2013 | Mittal |
| 8,392,376 | B2 | 3/2013 | Guo |
| 8,392,384 | B1 | 3/2013 | Wu et al. |
| 8,402,004 | B2 | 3/2013 | Provenzano et al. |
| 8,731,190 | B2 | 5/2014 | Lumb |
| 8,799,367 | B1 | 8/2014 | Condict et al. |
| 8,898,114 | B1 | 11/2014 | Feathergill et al. |
| 8,898,119 | B2 | 11/2014 | Sharma et al. |
| 8,943,023 | B2 | 1/2015 | Sorenson, III |
| 9,086,819 | B2 | 7/2015 | Panchbudhe et al. |
| 9,110,936 | B2 | 8/2015 | Li et al. |
| 9,152,500 | B1 | 10/2015 | Gardner |
| 9,317,218 | B1 * | 4/2016 | Botelho ............... G06F 3/0655 |
| 2003/0033498 | A1 | 2/2003 | Borman et al. |
| 2006/0155915 | A1 | 7/2006 | Pereira |
| 2007/0089041 | A1 | 4/2007 | Wu |
| 2007/0150755 | A1 | 6/2007 | Makii et al. |
| 2008/0228697 | A1 | 9/2008 | Adya et al. |
| 2009/0228511 | A1 | 9/2009 | Atkin et al. |
| 2009/0254507 | A1 | 10/2009 | Hosoya et al. |
| 2009/0259701 | A1 | 10/2009 | Wideman et al. |
| 2010/0070698 | A1 | 3/2010 | Ungureanu et al. |
| 2010/0174881 | A1 | 7/2010 | Anglin et al. |
| 2011/0055471 | A1 | 3/2011 | Thatcher et al. |
| 2011/0131390 | A1 | 6/2011 | Srinivasan et al. |
| 2011/0307447 | A1 | 12/2011 | Sabaa et al. |
| 2012/0089894 | A1 | 4/2012 | Winter |
| 2012/0166401 | A1 | 6/2012 | Li et al. |
| 2012/0215980 | A1 | 8/2012 | Auchmoody et al. |
| 2012/0226691 | A1 | 9/2012 | Edwards et al. |
| 2012/0246436 | A1 | 9/2012 | Wang et al. |
| 2013/0013865 | A1 | 1/2013 | Venkatesh et al. |
| 2013/0086006 | A1 | 4/2013 | Colgrove et al. |
| 2013/0086009 | A1 | 4/2013 | Li et al. |
| 2013/0117516 | A1 | 5/2013 | Sobolewski et al. |
| 2013/0198462 | A1 | 8/2013 | Serlet et al. |
| 2013/0268497 | A1 | 10/2013 | Baldwin et al. |
| 2013/0318288 | A1 | 11/2013 | Khan et al. |
| 2013/0346720 | A1 | 12/2013 | Colgrove et al. |
| 2014/0032925 | A1 | 1/2014 | Panchbudhe et al. |
| 2014/0074804 | A1 | 3/2014 | Colgrove et al. |
| 2014/0189348 | A1 | 7/2014 | El-Shimi et al. |
| 2014/0281134 | A1 | 9/2014 | Eitan et al. |
| 2016/0065540 | A1 | 3/2016 | Androulaki et al. |
| 2016/0291891 | A1 | 10/2016 | Cheriton et al. |
| 2016/0352511 | A1 | 12/2016 | Bashyam et al. |

FOREIGN PATENT DOCUMENTS

| | | |
|---|---|---|
| WO | WO-2011084854 A1 | 7/2011 |
| WO | WO-2012173859 A2 | 12/2012 |
| WO | WO-2013159582 A1 | 10/2013 |
| WO | WO-2015/178944 A1 | 11/2015 |
| WO | WO-2015167493 A1 | 11/2015 |
| WO | WO-2017/019079 | 2/2017 |

OTHER PUBLICATIONS

Black, D.L., "SDC-3—Thin Provisioning: Anchored," EMC Corporation, Mar. 10, 2010, T10/09-272r6, 16 pages.
Evans, M., "Information Technology—SCSI Black Commands—3 (SBC-3)," (Research Paper), Oct. 27, 2010, Working Draft Project American National Standard, T10/1799-D, 274 pages, available at http://www.13thmonkey.org/documentation/SCSI/sbc3r25.pdf.
Gilbert, D. "XCOPY and ODX in ddpt utility," (Research Paper), Dec. 27, 2014, 8 pages, available at http://sg.danny.cz/sg/ddpt_xcopy_odx.html.
Hewlett-Packard Development Company, L.P., "HP StoreOnce D2D: Understanding the Challenges Associated With NetApp's Deduplication," (Research Paper), Jan. 2011; Business white paper, 8 pages, available at https://www.mercurymagazines.com/pdf/NCHPINTELJMPDD1.pdf.
International Search Report & Written Opinion received in PCT Application No. PCT/US2014/036045, dated Jan. 26, 2015, 11 pages.
International Search Report & Written Opinion received in PCT Application No. PCT/US2015/042831, dated Apr. 26, 2016, 13 pages.
International Search Report & Written Opinion received in PCT Application No. PCTUS2014/062622, dated Jul. 21, 2015, 13 pages.
Osuna, A. et al., "IBM Storage Data Deduplication Solutions," (Research Paper), First Edition, Redbooks, Feb. 1, 2011, 328 pages, available at https://www.e-techservices.com/redbooks/DataDeduplicationSolutions.pdf.
Matt Kixmoeller, "Not Your Momma's Deduplication," Jan. 12, 2012, Pure Storage Blog, (Web Page), <http://blog.purestorage.com/not-your-mommas-deduplication/>.
Saxena, M. et al, "FlashVM: Virtual Memory Management on Flash," (Research Paper), USENIX Annual Technical Conference, 2010, 14 pages, available at https://www.usenix.org/legacy/event/usenix10/tech/full_papers/Saxena.pdf.
Sliwa, C., "Primary Storage Deduplication Options Expanding," (Web Page), Jan. 2012, 8 pages, available at http://searchstorage.techtarget.com/tip/Primary-storage-deduplication-options-expanding.
Storage Networking Industry Association, "Hypervisor Storage Interfaces for Storage Optimization White Paper," (Research Paper), Copy Offload Hypervisor Storage Interfaces, Jun. 2010, 44 pages, available at http://www.snia.org/sites/default/files/HSI_Copy_Offload_WP-r12.pdf.
Symantec Corporation, "About Deduplication Fingerprinting," (Web Page), Jan. 17, 2011 2 pages, available at http://www.symantec.com/business/support/index?page=content&id=HOWTO36304.
Symantec, "Veritas Storage Foundation™ from Symantec," (Research Paper), Data Sheet: Storage Management, 2011, 5 pages, available at http://www.federalnewsradio.com/pdfs/SYMAN TEC-bveritasstoragefoundationDS21213907enus.pdf.

(56) References Cited

OTHER PUBLICATIONS

Weber, R., "XCOPYv2: Copy Offload with Extended Copy (Introduction)," (Research Paper), available Jan. 2011, T10/11-077r0.
Wikipedia, "Reference Counting," See lines 1-2, Nov. 14, 2012, 8 pages, available at http://web.archive.org/web/20121114161651/http://en.wikipedia.org/wiki/Reference_counting.
Berrey, A., "Content-Addressable Distributed File System ("Keep")," (Research Paper), Apr. 17, 2013, 5 pages, available at https://arvados.org/projects/arvados/wiki/Keep.
Bonwick, J., "ZFS Deduplication," (Research Paper), Nov. 1, 2009, 21 pages, available at https://blogs.oracle.com/bonwick/entry/zfs_dedup.
Brown, N., "In-band Deduplication for Btrfs," (Research Paper), Mar. 9, 2016, 9 pages, available at https://lwn.net/Articles/679031/.
Floyd, J., "Deduplication and Encryption," (Web Page), Permabit, Aug. 28, 2009, 4 pages, available at http://permabit.com/deduplication-and-encryption/.
Hayes, J., "Excerpts from video: Building Commercial Storage Systems from Consumer SSDs," Oct. 1, 2012, https://vimeo.com/50557873.
Hayes, J., "Building Commercial Storage Systems from Consumer SSDs," Oct. 1, 2012, (Presentation Slides), http://www.snia.org/sites/default/orig/SDC2012/presentations/Solid_State/JohnHayes_Enterprise_Storage_Systems.pdf.
International Search Report & Written Opinion received in PCT Application No. PCT/US2014/047596, dated Jan. 28, 2015, 11 pages.
Nath, P., "Evaluating the Usefulness of Content Addressable Storage for High-Performance Data Intensive Applications," (Research Paper), Jun. 2008, 10 pages, http://www.cse.psu.edu/~bhuvan/papers/ps/cas-hpdc08.pdf.
International Preliminary Report on Patentability received in PCT Application No. PCT/US2014/057507, dated Mar. 28, 2017, 9 pages.
International Search Report & Written Opinion received in PCT Application No. PCT/US2014/057507, dated May 19, 2015, 13 pages.
Wikipedia, "Double hashing," May 12, 2014, <https://en.wikipedia.org/w/index.php?title=Double_hashing&oldid=608293366>.
Wikipedia, "Hash table," Aug. 25, 2014, <https://en.wikipedia.org/w/index.php?title=Hash_table&oldid=622699135>.
Wikipedia, "Linear probing," Jul. 17, 2014, <https://en.wikipedia.org/w/index.php?title=Linear_probing&oldid=617276154>.

\* cited by examiner

STORAGE OF A DATA CHUNK WITH A COLLIDING FINGERPRINT

BACKGROUND

Data deduplication is a technique used to increase storage capacity of a storage device. By using data deduplication, a redundant copy of a unique data chunk is identified and removed from the storage device. Thus, a single copy of the unique data chunk is stored in the storage device.

BRIEF DESCRIPTION OF THE DRAWINGS

Some examples of the present application are described with respect to the following figures.

DETAILED DESCRIPTION

As described above, data deduplication is a technique used to increase storage capacity of a storage device. To determine whether a data chunk is a redundant copy of an existing stored data chunk, a fingerprint of the data chunk is generated. The fingerprint may be a cyclic redundancy check (CRC) of the data chunk or a hash key of the data chunk. When the fingerprint matches another fingerprint, the match may indicate that the data chunk is a redundant copy. Thus, the storage device removes the data chunk.

However, the match may indicate a fingerprint collision rather than an indication of a redundant copy. A fingerprint collision occurs when two data chunks with different content generate identical fingerprints. Thus, the fingerprint of the data chunk may be a colliding fingerprint. A likelihood of a fingerprint collision is dependent on the fingerprint size. The larger the fingerprint size, the lower the likelihood. Thus, an accuracy of a data deduplication process is reduced when depending solely on fingerprint matching.

Examples described herein provide a storage device to store a data chunk with a colliding fingerprint. For example, a storage device may receive a first data chunk from a source device. The storage device may generate a first fingerprint of the first data chunk. The storage device may compare the first fingerprint to a second fingerprint of a second data chunk stored in the storage device. In response to a determination that the first fingerprint matches the second fingerprint, the storage device may select a storage pool from a plurality of storage pools associated with the storage device to store the first data chunk based on the first data chunk and based on the second data chunk. The plurality of storage pools includes a first storage pool associated with first particular data chunks with non-colliding fingerprints and a second storage pool associated with second particular data chunks with colliding fingerprints. In this manner, examples described herein may increase an accuracy of a data deduplication process.

Figure 1:
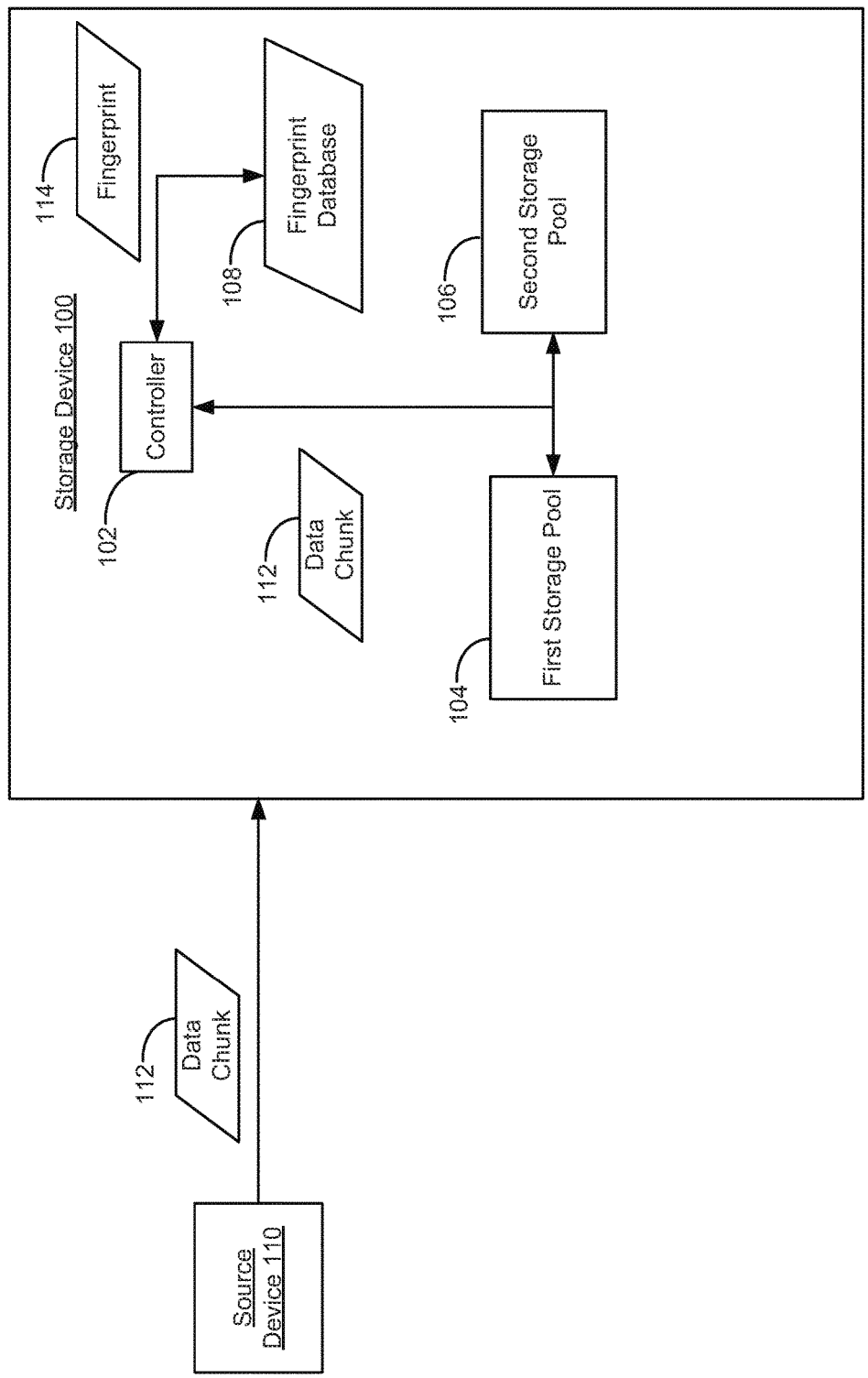
FIG. 1 is a block diagram of a storage device to store a data chunk with a colliding fingerprint, according to an example.

Referring now to the figures, FIG. 1 is a block diagram of a storage device 100 to store a data chunk with a colliding fingerprint, according to an example. As used herein, a colliding fingerprint may be a fingerprint generated from a data chunk that matches another fingerprint generated from a different data chunk (i.e., the two data chunks have different content). Storage device 100, for example, may be a storage system that performs data deduplication on stored data, a storage array, a hard disk drive, a solid state drive, or any electronic device suitable to store data.

Storage device 100 may include a controller 102, a first storage pool 104, a second storage pool 106, and a fingerprint database 108. Controller 102 may be, for example, a central processing unit (CPU), a semiconductor-based microprocessor, and/or other hardware devices suitable for retrieval and execution of instructions stored in a computer-readable storage medium (not shown) of storage device 100. Controller 102 may fetch, decode, and execute instructions to control a process of storing a data chunk with a colliding fingerprint to a storage pool, such as second storage pool 106. As an alternative or in addition to retrieving and executing instructions, controller 102 may include at least one electronic circuit that includes electronic components for performing the functionality of the instructions.

First storage pool 104 may include, for example, one or more storage devices, one or more logical storage volumes, etc. First storage pool 104 may store data chunks with non-colliding fingerprints. As used herein, a non-colliding fingerprint may be a fingerprint that has no matching fingerprints stored in fingerprint database 108. Second storage pool 106 may be similar to first storage pool 104. Second storage pool 106 may store data chunk with colliding fingerprints. Fingerprint database 108 may be a database that stores fingerprints of data chunks stored in storage device 100 or associated with storage device 100.

During operation, a source device 110 may transfer a data chunk 112 to storage device 100 for storage. Source device 110 may be a computing device, such as a tablet computer, a laptop computer, a desktop computer, a smart phone, etc. In response to receiving data chunk 112, controller 102 may perform a data deduplication operation to determine how data chunk 112 is to be stored. Controller 102 may generate a fingerprint 114 of data chunk 112. Controller 102 may compare fingerprint 114 to at least one fingerprint stored in fingerprint database 108. When fingerprint 114 does not match any fingerprint in fingerprint database 108, controller 102 may determine that fingerprint 114 is a non-colliding fingerprint.

Thus, controller 102 may determine that data chunk 112 is a unique data chunk and is not a redundant copy of an existing data chunk already stored in storage device 100. Controller 102 may store data chunk 112 in first storage pool 104. Controller 102 may also store fingerprint 114 to fingerprint database 108 for comparison with subsequently generated fingerprints.

When fingerprint 114 matches a particular fingerprint in fingerprint database 108, controller 102 may compare data chunk 112 to a particular data chunk having the particular fingerprint from first storage pool 104 and/or second storage pool 106, For example, controller 102 may compare data chunk to the particular data chunk via a byte by byte comparison. When data chunk 112 matches the particular data chunk, controller 102 may determine that data chunk 112 is a redundant copy of the particular data chunk. Thus, controller 102 may store a reference or a pointer to the particular data chunk in the storage pool where the particular data chunk is stored. Controller 102 may also discard fingerprint 114.

When data chunk 112 mismatches the particular data chunk, controller 102 may determine that data chunk 112 is a unique data chunk that is not currently stored in storage device 100. Controller 102 may determine that fingerprint 114 is a colliding fingerprint. Controller 102 may store data chunk 112 in second storage pool 106. In some examples, controller 102 may discard fingerprint 114 after comparing data chunk 112 to the particular data chunk and associate the particular fingerprint to data chunk 112. Thus, by utilizing separate storage pools, one for data chunks with non-colliding fingerprints and one for data chunks with colliding fingerprints, a unique data chunk with a colliding fingerprint may be efficiently handled by storage device 100.

In some examples, a data chunk may be stored to a location in first storage pool 104 based on a three level page table translation of a fingerprint of the data chunk. A data chunk may be stored to a location in second storage pool 106 based on a three level page table translation of an offset of the data chunk. Thus, the same data chunk storage and retrieval mechanism may be used for storage pools 104 and 106.

Figure 2:
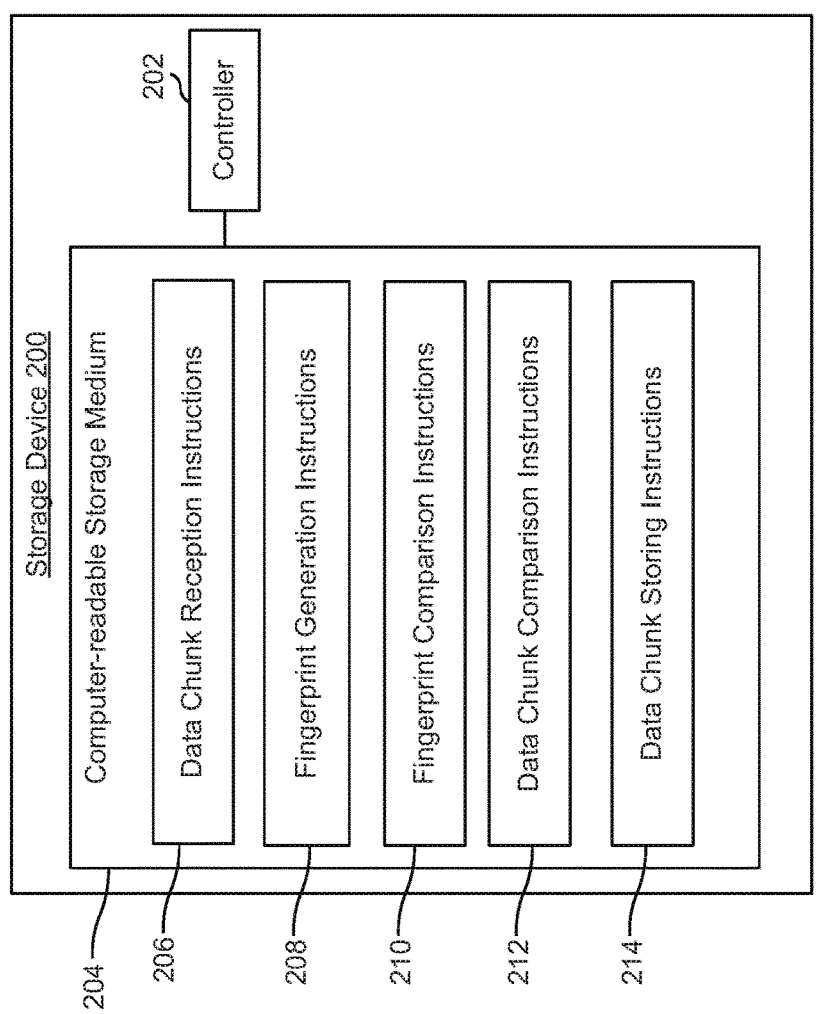
FIG. 2 is a is a block diagram of a storage device to store a data chunk with a colliding fingerprint, according to an example.

FIG. 2 is a block diagram of a storage device 200 to store a data chunk with a colliding fingerprint, according to an example. Storage device 200 may be similar to storage device 100 of FIG. 1. Storage device 200 may include a controller 202 and a computer-readable storage medium 204. Controller 202 may be similar to controller 102. Controller 202 may fetch, decode, and execute instructions 206-214 to control a process of storing a data chunk with a colliding fingerprint to a storage pool, such as first storage pool 104.

Computer-readable storage medium 204 may be any electronic, magnetic, optical, or other physical storage device that contains or stores executable instructions. Thus, computer-readable storage medium 204 may be, for example, Random Access Memory (RAM), an Electrically Erasable Programmable Read-Only Memory (EEPROM), an optical disc, etc. In some examples, computer-readable storage medium 204 may be a non-transitory storage medium, where the term "non-transitory" does not encompass transitory propagating signals. As described in detail below, computer-readable storage medium 204 may be encoded with a series of processor executable instructions 206-214 to store a data chunk with a colliding fingerprint in storage device 200.

Data chunk reception instructions 206 may receive a data chunk from a source device for storage, such as data chunk 112 of FIG. 1. Fingerprint generation instructions 208 may generate a fingerprint based on the data chunk, such as fingerprint 114. Fingerprint comparison instructions 210 may compare the fingerprint to other fingerprints stored in storage device 200.

When the fingerprint matches another fingerprint in storage device 200, data chunk comparison instructions 212 may compare the data chunk to another data chunk that is used to generate the matching fingerprint. When the data chunk matches the other data chunk, data chunk storing instructions 214 may store a reference or a pointer to the other data chunk in a first storage pool associated with data chunks with non-colliding fingerprints, such as first storage pool 104. When the data chunk mismatches the other data chunk, data chunk storing instructions 214 may store the data chunk in a second storage pool separate from the first storage pool, such as second storage pool 106. The second storage pool may be associated with data chunks with colliding fingerprints. When the fingerprint mismatches the fingerprints in storage device 200, data chunk storing instructions 214 may store the data chunk in the second storage pool.

Figure 3:
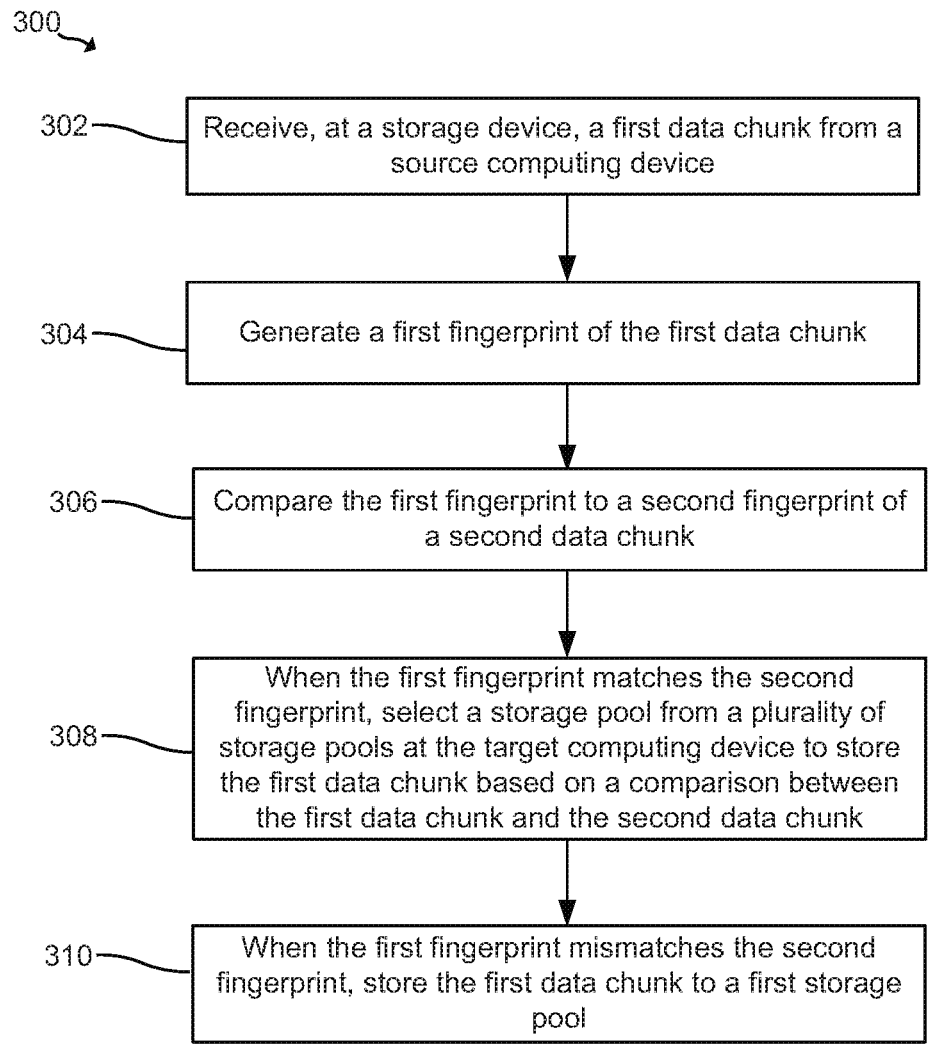
FIG. 3 is a flowchart illustrating a method of storing a data chunk with a colliding fingerprint, according to an example.

FIG. 3 is a flowchart illustrating a method 300 of storing a data chunk with a colliding fingerprint, according to an example. Method 300 may be implemented using storage device 100 of FIG. 1 and/or storage device 200 of FIG. 2. Method 300 includes receiving, at a storage device, a first data chunk from a source device, at 302. For example, referring to FIG. 1, storage device 100 may receive data chunk 112 from source device 110.

Method 300 also includes generating a first fingerprint of the first data chunk, at 304. For example, referring to FIG. 1, controller 102 may generate fingerprint 114 based on data chunk 112. Method 300 further includes comparing the first fingerprint to a second fingerprint of a second data chunk, at 306. For example, referring to FIG. 1, controller 102 may compare fingerprint 114 to at least one fingerprint stored in fingerprint database 108.

Method 300 further includes, when the first fingerprint matches the second fingerprint, selecting a storage pool from a plurality of storage pools associated with the storage device to store the first data chunk based on a comparison between the first data chunk and the second data chunk, where the plurality of storage pools includes a first storage pool associated with first particular data chunks with non-colliding fingerprints and a second storage pool associated with second particular data particular data chunks with colliding fingerprints, at 308. For example, referring to FIG. 1, when fingerprint 114 matches a fingerprint from fingerprint database 108, controller 102 may compare data chunk 112 to a data chunk used to generate the matching fingerprint. Controller 102 may store data chunk 112 in first storage pool 104 when data chunk 112 matches the data chunk. Controller 102 may store data chunk in second storage pool 106 when data chunk 112 mismatches the data chunk.

Method 300 further includes, when the first fingerprint mismatches the second fingerprint, storing the first data chunk in the first storage pool, at 310. For example, referring to FIG. 1, controller 102 may store data chunk to first storage pool 104 when fingerprint 114 does not match any fingerprint in fingerprint database 108.

Figure 4:
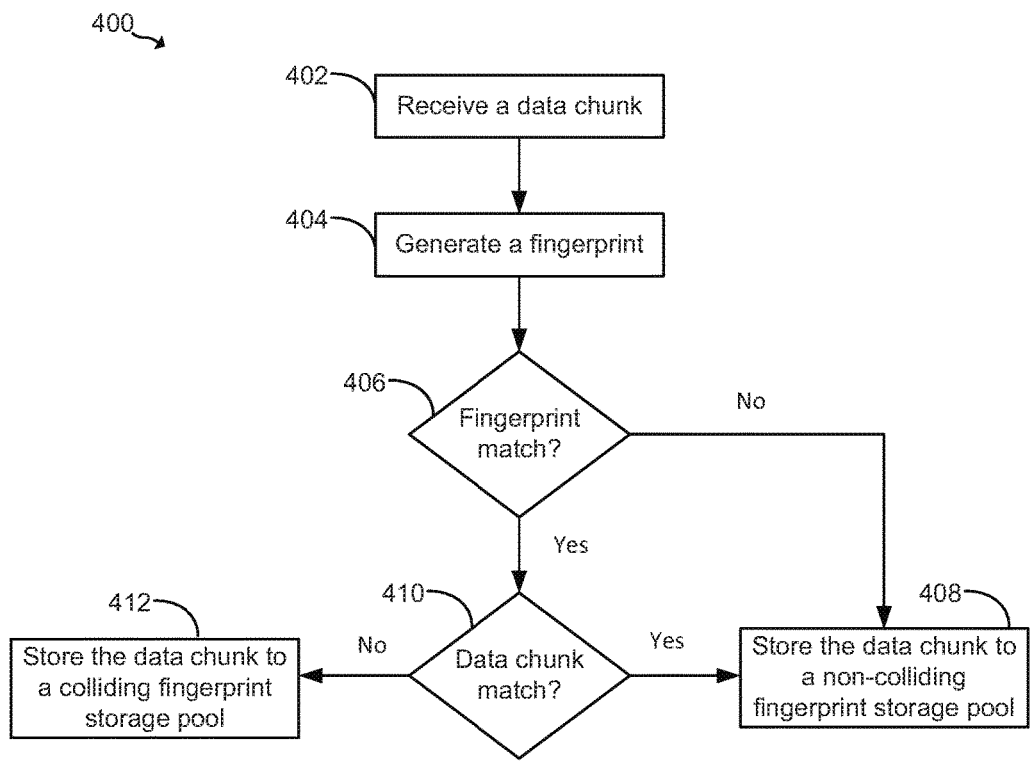
FIG. 4 is a flowchart illustrating a method of storing a data chunk with a colliding fingerprint, according to an example.

FIG. 4 is a flowchart illustrating a method 400 of storing a data chunk with a colliding fingerprint, according to an example. Method 400 may be implemented using storage device 100 of FIG. 1 and/or storage device 200 of FIG. 2. Method 400 includes receiving data chunk, at 402. For example, referring to FIG. 1, storage device 100 may receive data chunk 112 from source device 110.

Method 400 also includes generating a fingerprint, at 404. For example, referring to FIG. 1, controller 102 may generate fingerprint 114 based on data chunk 112. Method 400 further includes comparing the fingerprint to one or more fingerprints in a storage device, at 406. For example, referring to FIG. 1, controller 102 may compare fingerprint 114 to at least one fingerprint stored in fingerprint database 108.

When the fingerprint does not match any of the fingerprints, method 400 further includes storing the data chunk to a non-colliding fingerprint storage pool. For example, referring to FIG. 1, controller 102 may store data chunk to storage pool 104. When the fingerprint matches a fingerprint, method 400 further includes comparing the data chunk to another data chunk used to generate the matching fingerprint, at 410. For example, referring to FIG. 1, controller 102 may compare data chunk 112 to a particular data chunk used to generate the matching fingerprint.

When the data chunk matches the other data chunk, the data chunk is stored in the non-colliding fingerprint storage pool, at 408. When the data chunk mismatches the other data chunk, method 400 further includes storing the data chunk to a colliding fingerprint storage pool, at 412. For example, referring to FIG. 1, controller 102 may store data chunk 112 in second storage pool 106.

According to the foregoing, examples disclosed herein enable a storage device to store a data chunk with a colliding fingerprint. The storage device may compare a fingerprint of a data chunk to one or more fingerprints stored in the storage device. When there is a matching fingerprint, the storage device may compare the data chunk to another data chunk used to generate the matching fingerprint. When the data chunk matches the other data chunk, the data chunk may be a redundant copy of the other data chunk. Thus, the storage device may store a reference or a pointer to the other data chunk. When the data chunk mismatches the other data chunk, the data chunk may be a unique data chunk. Thus, the storage device may store the data chunk to a storage pool separate from a storage pool that is used to store the other data chunk. Thus, the data chunk with a colliding fingerprint is not mistakenly identified as a redundant copy of another data chunk and an accuracy of a data deduplication process in the storage device may be increased.

The use of "comprising", "including" or "having" are synonymous and variations thereof herein are meant to be inclusive or open-ended and do not exclude additional unrecited elements or method steps.

What is claimed is:

1. An apparatus comprising:
   a controller; and
   a computer-readable storage medium comprising instructions that, when executed by the controller, cause the controller to:
      receive a first data chunk from a source device;
      generate a first fingerprint of the first data chunk;
      in response to a determination that the first fingerprint does not match any of a plurality of fingerprints, including a second fingerprint of a second data chunk, store the first data chunk in a first storage pool associated with first particular data chunks having non-colliding fingerprints; and
      in response to determinations that the first fingerprint matches the second fingerprint of the second data chunk and the first data chunk does not match the second data chunk, store the first data chunk in a second storage pool associated with second particular data chunks with colliding fingerprints.

2. The apparatus of claim 1, wherein the instructions, when executed by the controller, further cause the controller to:
   when the first data chunk matches the second data chunk and the second data chunk is stored in the first storage pool, store a pointer to the second data chunk in the first storage pool.

3. The apparatus of claim 2, wherein the first storage pool is different from the second storage pool.

4. The apparatus of claim 1, wherein the instructions, when executed by the controller, further cause the controller to:
   determine a location in the second storage pool to store the first data chunk based on a three level page table translation of an offset of the first data chunk.

5. The apparatus of claim 1, wherein the instructions, when executed by the controller, further cause the controller to:
   in response to the determination that the first fingerprint does not match any of the plurality of fingerprints, store the first data chunk to a location of the first storage pool based on a three level page table translation of the first fingerprint.

6. A method comprising:
   receiving, at a storage device, a first data chunk from a source device;
   generating a first fingerprint of the first data chunk;
   comparing the first fingerprint to a plurality of fingerprints, including a second fingerprint of a second data chunk;
   when the first fingerprint does not match the second fingerprint, storing the first data chunk in a first storage pool of a plurality of storage pool associated with at least one storage device, the first storage pool associated with data chunks having non-colliding fingerprints;
   when the first fingerprint matches the second fingerprint and the first data chunk does not match the second data chunk, storing the first data chunk in a second storage pool associated with data chunks having colliding fingerprints.

7. The method of claim 6, further comprising:
   in response to determinations that the first fingerprint matches the second fingerprint and the first data chunk matches the second data chunk, storing a pointer to the second data chunk to the first storage pool for the first data chunk.

8. The method of claim 6, further comprising, when storing the first data chunk in the second storage pool, determining a location in the second storage pool to store the first data chunk based on a three level page table translation of an offset of the first data chunk.

9. The method of claim 6, further comprising, when the first fingerprint does not match any of the plurality of fingerprints, storing the first data chunk in a location of the first storage pool based on a three level page table translation of the first fingerprint.

10. The method of claim 6, wherein the first storage pool is different from the second storage pool.

11. A computer-readable storage medium comprising instructions that when executed cause a controller of a storage device to:
   receive a first data chunk from a source device;
   generate a first fingerprint of the first data chunk;
   compare the first fingerprint to a plurality of fingerprints, including a second fingerprint of a second data chunk;
   when the first fingerprint does not match any of the plurality of fingerprints, store the first data chunk in a first storage pool associated with non-colliding fingerprints;
   when the first fingerprint matches the second fingerprint, compare the first data chunk to the second data chunk; and
   when the first fingerprint matches the second fingerprint and the first data chunk does not match the second data chunk, store the first data chunk in a second storage pool associated with colliding fingerprints.

12. The computer-readable storage medium of claim 11, wherein the first data chunk is compared to the second data chunk via a byte by byte comparison.

13. The computer-readable storage medium of claim 11, further comprising instructions that when executed cause the controller of the storage device to:

when the first data chunk is to be stored in the first storage pool, store the first data chunk in a location of the first storage pool based on a three level page table translation of the first fingerprint.

14. The computer-readable storage medium of claim 11, further comprising instructions that when executed cause the controller of the storage device to:

when the first data chunk is to be stored in the second storage pool, store the first data chunk in a location of the second storage pool based on a three level page table translation of an offset of the first data chunk.

15. The computer-readable storage medium of claim 11, wherein the first storage pool is different from the second storage pool.

16. The computer-readable storage medium of claim 11 further comprising instructions that when executed cause the controller of the storage device to:

when the first fingerprint matches the second fingerprint and the first data chunk matches the second data chunk, for the first data chunk, store a pointer to the second chunk in the first storage pool associated with non-colliding fingerprints.

* * * * *